Dec. 8, 1936.  O. PROBACH  2,063,339
METALWORKING MACHINE
Filed Oct. 2, 1935  2 Sheets—Sheet 1

Dec. 8, 1936.     O. PROBACH     2,063,339
METALWORKING MACHINE
Filed Oct. 2, 1935     2 Sheets-Sheet 2

Inventor:
Otto Probach
By [signature]
Attorney

Patented Dec. 8, 1936

2,063,339

UNITED STATES PATENT OFFICE 2,063,339

METALWORKING MACHINE

Otto Probach, Leipzig-Mockern, Germany, assignor to The National Acme Company, Cleveland, Ohio, a corporation of Ohio Application October 2, 1935, Serial No. 43,135
In Germany May 26, 1933

12 Claims. (Cl. 29—60)

The invention relates to metal working machines and more particularly to automatic machine tools having a plurality of work spindles and a magazine for the blanks.

It is an object of the invention to provide a mechanism for conveying the blanks from the magazine and introducing them into the chucks of the spindles during the idle period, i. e. during the time during which the tools are withdrawn, the spindle carrier is indexed and the tools are advanced again for a new operation.

A further object of the invention is the provision of an improved loading mechanism, simple in construction, efficient in use, easily applied and consisting of but few parts.

According to the present invention, the loading mechanism comprises a cross-slide reciprocating during the idle period between successive tooling operations between the magazine and one operating position of a spindle to bring individual blanks into alignment with the chuck of the said spindle and means associated with the cross-slide for longitudinal displacement of an aligned blank into the chuck prior to the commencement of the next tooling operation. Preferably a longitudinal slide actuated from a cam on the shaft carrying the cam actuating the cross-slide serves for introducing the aligned blank into the chuck.

In the accompanying drawings which illustrate by way of example one constructional form of the invention:

The invention is shown applied to an automatic metal working machine provided with a plurality of work spindles as e. g. an automatic turret lathe, the main construction of which follows normal practice. The machine has a frame upon which the spindle carrier 18 is mounted, carrying a plurality of work spindles 21 each provided with a collet or chuck 20.

Each spindle head 21 is constructed in known manner and adapted to grip the work blank inserted therein under the control of the usual mechanism, while ejecting means such as interchangeable resilient stop pins provided with a flange are adapted to be fitted within the standard jaws 22ª.

Figure 2:
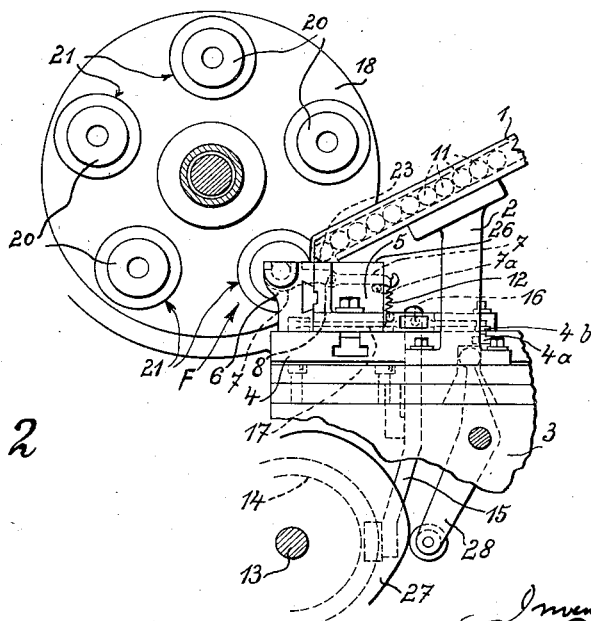
Fig. 2 is a side view of the cross-slide and magazine when in the chucking position.
Figure 7:
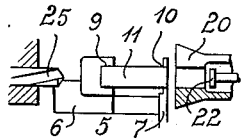
Figs. 7a–7f show in diagrammatic form the sequence of operations at the loading and unloading spindle position from the chucking operation of a blank to the ejection of the worked article.

The spindle carrier 18 is adapted to be indexed into the successive operating positions in known manner, to allow the various tools, as e. g. the tools 25 on the tool slide or tool slides 19, to operate upon the articles to be worked and carried by the various work spindles. The operating position F is that at which the worked articles are ejected or removed from the spindles, and a new blank inserted as indicated in Fig. 2 and Fig. 7f.

In the frame is mounted a cam shaft 13 carrying the various cams for operating the several parts of the machine, these cams including a cam 14 and a cam 27, the purpose of which will be later described.

Figure 1:
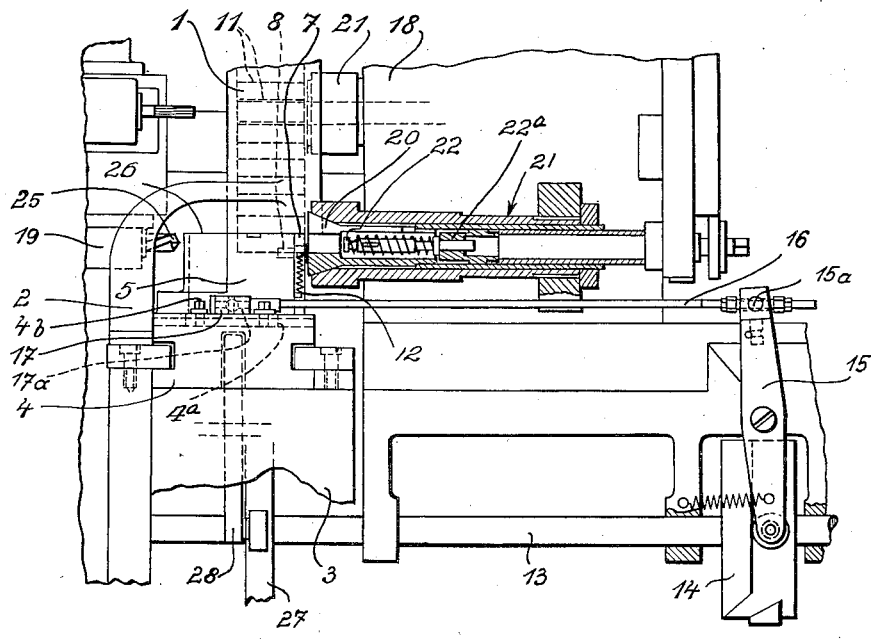
Fig. 1 is a sectional side elevation of part of an automatic metal working machine with five spindles embodying the invention.

The blanks 11 to be worked are carried in an inclined magazine 1 which is rigidly connected to the cross-slide support or frame 3 of the machine by means of a bracket 2. The cross-slide support 3 slidably carries a cross-slide 4 on which is secured an adjustable guide block 5 provided with an upper flat surface and supporting a longitudinally movable slide 6. The cross-slide 4 is arranged to be moved backwards and forwards in its guideway by suitably timed means such for instance by a cam 27 mounted upon and driven by the cam shaft 13 of the machine as shown in Fig. 1. The said cam 27 acts upon a double armed lever 28 pivoted to the machine frame and carrying at its lower end a follower roller engaging the cam 27, the upper end being in engagement with the cross-slide 4. The magazine I is constructed as shown as an inclined closed trough terminating at its lower end in an aperture 23 immediately above the level of the upper surface 26 of the guide block 5, if the cross-slide 4 is moved forwardly towards the work spindles.

The longitudinally movable slide 6 is provided on its upper side with a recess 9 closed at one end and forming a pocket. This recess 9 is located in alignment with the aperture 23 of the magazine when the cross-slide 4 is moved rearwardly to its loading position as will be later described.

The said slide 6 is arranged to be moved to and fro upon the guide block 5 in a direction parallel with the axes of the work spindles under the control of a cam drum 14 carried by and secured to the cam shaft 13. This movement of the slide is effected by means of a two armed lever 15 pivoted to the frame of the machine and carrying at its lower end a follower roller in engagement with suitable cams on the cam drum 14 while its upper end is connected by a link 16 to a lever 17 which is pivoted at one end to the cross-slide 4 and is in engagement with the longitudinally movable slide 6 at its upper end.

To accommodate the adjustment of the guide block 5 such as is necessary in accordance with varying sizes of work being handled, the fulcrum or pivot of the lever 17 is made adjustable by its arrangement upon a slide block 4ª carried in a groove in the cross-slide 4 and arranged to be clamped in position by bolts 4ᵇ. In view of the arcuate motion of the upper end of the lever 15 and the transverse motion imparted to the cross-slide 4 carrying the guide block 5 and lever 17, suitably flexible or universal type joints are provided at the points of connection 15ª and 17ª, respectively, of the link 16 to the levers 15 and 17.

Figure 3:
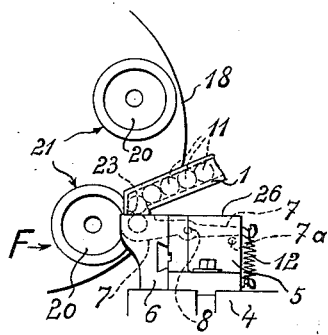
Fig. 3 is a fragmentary view similar to Fig. 2 but with the parts in the blank loading position.
Figure 4:
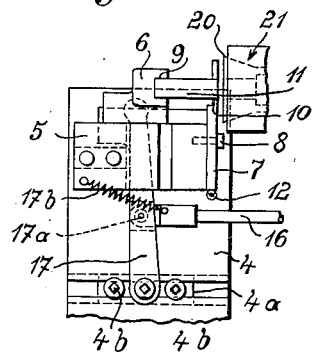
Fig. 4 is a plan view of the cross-slide and associated parts in the position immediately prior to the chucking operation.
Figure 5:
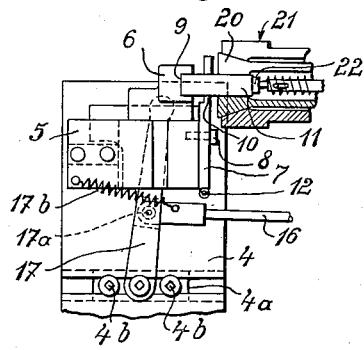
Fig. 5 is a view similar to Fig. 4 after the chucking operation.

A cradle lever 7 is pivotally mounted by means of a pivot pin 8 to the right hand side (as viewed in Figs. 1, 4, and 5) of the guide block 5. This cradle lever 7 is also provided at one end with a recess 10 and is held in its normal position with its recess 10 in alignment with the recess 9 in the slide 6 by the action of a spring 12 secured at one end to the cradle lever 7 and at the other end to the guide block 5 and serving to urge this lever 7 against a stop pin 7ª as shown in Fig. 3.

Figure 7C:
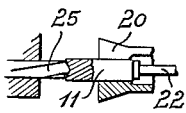
Figure 7A:
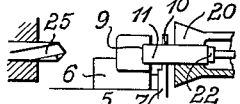

The operation of the loading mechanism is as follows: The magazine 1 is filled with work blanks 11 and due to the inclined position of the magazine, these blanks are gravity fed to the outlet aperture 23. When the cross slide 4 carrying the guide block 5, slide 6 and cradle lever 7 is moved into the position shown in Fig. 3 under the control of the cam 27, the recesses 9 and 10 come beneath the aperture 23 and the lowermost blank 11 within the magazine falls into these recesses and is carried thereby (Fig. 7a). During this operation the usual high speed indexing of the spindle carrier 18 takes place, and when completed the cross slide 4 and parts carried thereby are rapidly moved by the cam 27 to the position shown in Fig. 2. In this position the recesses 9 and 10 together with the work blank 11 carried therein are in axial alignment with the work spindle 21 at the operating position F. The upper surface 26 of the guide block 5 acts to close the aperture 23 and so prevent displacement of the remaining work blanks 11 contained therein.

Figure 6:
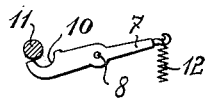
Fig. 6 is a detail view showing the operation of the spring urged cradle lever.
Figure 7D:
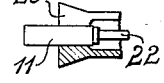
Figure 7B:
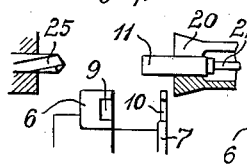
Figure 7E:
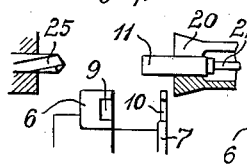

As soon as this position of alignment of the work blank with the spindle 21 is reached the slide 6 is moved longitudinally under the control of the cam 14 through the intermediary of lever 15, link 16 and lever 17, and by reason of the closed end pocket formation of the recess 9, the work blank 11 is shifted longitudinally through the cradle lever recess 10 into the orifice of the chuck 20 of the work spindle 21 at the operating position F. This chuck 20 is opened by the appropriate operation of its control mechanism in known manner. The blank 11 is inserted into the chuck 20 by the continued movement of the slide 6 and eventually displaces the head of the spring urged stop pin 22; the chuck 20 is then closed by its operating mechanism and grips the blank 11 in position with the stop pin 22 compressed (Fig. 7b). When the blank 11 has been gripped by the chuck the slide 6 is restored to its retracted position by the operation of the cam 14 and is thus freed from the blank 11. The cross-slide 4 carrying the guide block 5, slide 6 and associated parts is then retracted to the position shown in Figs. 3 and 7c, the cradle lever 7 being depressed by contact with the blank 11 held by the chuck 20 as shown in Fig. 6, but is restored to its position with the recess 10 in alignment with the pocket-recess 9 of the slide 6 by the action of the spring 12. Immediately the cross slide 4 is withdrawn as above described, the space in front of the chuck 20 is entirely free and it is possible to arrange to operate upon the blank 11 gripped by the chuck with an appropriate tool 25 (Fig. 7d) while still in the operating position F normally assigned to removal and introduction of work. At the conclusion of the tooling operation, during which the tool 25 has been applied to the blank 11, this tool is withdrawn in unison with the tools at the other operating positions, and the spindle carrier 18 is then rapidly indexed to bring the work spindles 21 to their next operating positions, thus presenting a worked article 11ª at the operating position F (Fig. 7e). The chuck 20 is then opened by its associated mechanism in known manner and by reason of the previous compression of the spring urged stop pin 22, the worked article 11ª is ejected (Fig. 7f). Meanwhile the cross-slide 4 in its retracted position has once more brought the recesses 9 and 10 into register with the aperture 23 of the magazine 1 and a new blank 11 loaded in the manner previously described. After the ejection of the worked article the mechanism is ready (Fig. 7f) to repeat the above described cycle of operations, and so obtain an unloading, loading and tooling operation at the operating station F in addition to the normal operations at the remaining stations.

Therefore, according to the invention it is possible for as many tools to be provided as there are working spindles because the loading is completed before the tools again become operative and there is no need to dispense with the use of a tool in the loading position.

What I claim is:

1. In an automatic metal working machine, the combination of a rotary spindle carrier, a plurality of rotary work spindles carried thereby, a chuck for each work spindle, a magazine for the blanks, a cross-slide adapted to be moved at right angles to the axes of the work spindles and means carried by the said cross-slide and comprising a pair of work supporting members, one shiftable transversely of said cross-slide for tranferring a blank from the magazine to the chuck.

2. In an automatic metal working machine, the combination of a rotary spindle carrier, a plurality of rotary work spindles carried thereby, a chuck for each work spindle, a magazine for the blanks, a cross-slide adapted to be moved at right angles to the axes of the work spindles, and a pair of work supporting members mounted on the cross slide and having movements in transverse planes, one shiftable to feed the work into the chuck and the other shiftable to free the work.

3. In an automatic metal working machine the combination of a rotary spindle carrier, a plurality of rotary work spindles carried thereby, a chuck for each work spindle, a magazine for the blanks, a cross-slide adapted to be moved at right angles to the axes of the work spindles, and means carried by the cross slide and comprising a pair of work supporting members, one shiftable transversely of said cross slide for transferring a blank from the magazine to the chuck, said transversely shiftable member actuated by cams of a cam shaft.

4. In an automatic metal working machine the combination of a rotary spindle carrier, a plurality of rotary work spindles carried thereby, a chuck for each work spindle, a magazine for the blanks, a cross-slide adapted to be moved at right angles to the axes of the work spindles, and a pair of work supporting members mounted on the cross slide and having movements in transverse planes, one shiftable to feed the work into the chuck and the other shiftable to free the work, the latter having a recess for supporting one end of the blank fed from the magazine.

5. In an automatic metal working machine the combination of a rotary spindle carrier, a plurality of rotary work spindles carried thereby, a chuck for each work spindle, a magazine for the blanks, a cross-slide adapted to be moved at right angles to the axes of the work spindles and a longitudinal slide mounted on the cross-slide and provided with a recess means for actuating said longitudinal slide, a cradle lever pivoted on the cross-slide and provided with a recess for supporting the other end of the blank fed.

6. In an automatic metal working machine the combination of a rotary spindle carrier, a plurality of rotary work spindles carried thereby, a chuck for each work spindle, a magazine for the blanks, a cross-slide adapted to be moved at right angles to the axes of the work spindles, a longitudinal slide mounted on the cross-slide and provided with a recess, means for actuating said longitudinal slide, a spring pressed cradle lever pivoted on the cross-slide and provided with a recess.

7. In an automatic metal working machine the combination of a rotary spindle carrier, a plurality of rotary work spindles carried thereby, a chuck for each work spindle, a magazine for the blanks, a cross-slide adapted to be moved at right angles to the axes of the work spindles and a longitudinal slide mounted on the cross-slide and provided with a recess forming a pocket for one end of the blank fed, means for actuating said longitudinal slide, a spring pressed cradle lever pivoted on the said cross-slide and provided with a recess over which the blank is shifted into the chuck.

8. In an automatic metal working machine the combination of a rotary spindle carrier, a plurality of rotary work spindles carried thereby, a chuck for each work spindle, a magazine for the blanks, a cross-slide, means including a pivotally mounted lever operated by a cam of the cam drum for moving the said cross-slide rectangular to the axes of the work spindles, a longitudinal slide mounted on the cross-slide and means including a pivotally mounted lever operated by a cam of the said cam shaft for moving the said longitudinal slide in the axial direction of the work spindles.

9. In an automatic metal working machine the combination of a rotary spindle carrier, a plurality of rotary work spindles carried thereby, a chuck for each work spindle, a magazine for the blanks, a cross-slide adapted to be moved at right angles to the axes of the work spindles and a longitudinal slide mounted on the cross-slide and provided with a recess forming a pocket for one end of the blank fed, a spring pressed cradle lever pivoted on the said cross-slide, means for moving the longitudinal slide and comprising a pivotally mounted lever operated by a cam, a link connected to the said lever and a second pivotally mounted lever, the upper end of which engages the longitudinal slide.

10. In an automatic metal working machine the combination of a rotary spindle carrier, a plurality of rotary work spindles carried thereby, a chuck for each work spindle, a magazine for the blanks, a cross-slide adapted to be moved at right angles to the axes of the work spindles and a longitudinal slide mounted on the cross-slide and provided with a recess forming a pocket for one end of the blank fed, a spring pressed cradle lever pivoted on the said cross-slide, means for moving the longitudinal slide and comprising a pivotally mounted lever operated by a cam, a link connected to the said lever and a second pivotally mounted lever influenced by a spring and the pivot of which being adjustable and the upper end of which engages the longitudinal slide.

11. In an automatic metal working machine the combination of a rotary spindle carrier, a plurality of rotary work spindles carried thereby, a chuck for each work spindle, a magazine for the blanks, a cross-slide adapted to be moved at right angles to the axes of the work spindles and a longitudinal slide mounted on the cross-slide and provided with a recess forming a pocket for one end of the blank fed, a spring pressed cradle lever pivoted on the said cross-slide, means for moving the longitudinal slide and comprising a pivotally mounted lever operated by a cam, a link connected to the said lever and a second pivotally mounted lever influenced by a spring and the pivot of which being adjustable and the upper end of which engages the longitudinal slide, universal joints being provided to the points of connection between the link and both levers.

12. In an automatic metal working machine the combination of a rotary spindle carrier, a plurality of rotary work spindles carried thereby, a chuck for each work spindle, a magazine for the blanks and having an outlet aperture, a cross-slide adapted to be moved at right angles to the axes of the work spindles and carrying a guide block provided with a flat upper surface for the purpose of closing the outlet aperture of the magazine in its forward movement with the cross-slide, a longitudinal slide mounted on the said cross-slide and means for actuating said last slide.

OTTO PROBACH.